(12) United States Patent
Yamaoka et al.

(10) Patent No.: US 9,918,428 B2
(45) Date of Patent: Mar. 20, 2018

(54) ROTATING ASSEMBLY FOR GRASS TRIMMER

(71) Applicant: CHERVON (HK) LIMITED, Wanchai (HK)

(72) Inventors: Toshinari Yamaoka, Nanjing (CN); Qihao Sun, Nanjing (CN); Jianpeng Guo, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 21 days.

(21) Appl. No.: 15/263,983

(22) Filed: Sep. 13, 2016

(65) Prior Publication Data

US 2017/0079204 A1 Mar. 23, 2017

(30) Foreign Application Priority Data

Sep. 17, 2015 (CN) .......................... 2015 1 0595798
Sep. 17, 2015 (CN) ..................... 2015 2 0721673 U

(51) Int. Cl.
*A01D 34/416* (2006.01)
(52) U.S. Cl.
CPC ................................ *A01D 34/4165* (2013.01)
(58) Field of Classification Search
CPC .................................................. A01D 34/4165
See application file for complete search history.

(56) References Cited

U.S. PATENT DOCUMENTS

| | | | | | |
|---|---|---|---|---|---|
| 2,777,271 | A | * | 1/1957 | Sutton | A01D 43/077 56/13.4 |
| 4,124,938 | A | * | 11/1978 | Ballas, Sr. | A01G 3/06 30/276 |
| 4,227,280 | A | * | 10/1980 | Comer | A01D 42/06 15/330 |
| 4,835,950 | A | * | 6/1989 | Cerreta | A01D 34/416 56/12.8 |
| 5,657,542 | A | * | 8/1997 | White, III | A01D 34/416 30/276 |
| 5,768,749 | A | * | 6/1998 | Ohi | A47L 5/14 15/328 |
| 6,023,847 | A | * | 2/2000 | Niedl | A01D 34/416 30/276 |
| 7,100,287 | B2 | * | 9/2006 | McCoid | A01D 34/90 30/276 |
| 9,078,394 | B2 | * | 7/2015 | Harless | A01D 34/416 |
| 9,472,992 | B2 | * | 10/2016 | Shaffer | H02K 5/08 |
| 9,750,180 | B2 | * | 9/2017 | Pearson | A01D 34/4165 |
| 2001/0027610 | A1 | * | 10/2001 | Wheeler | A01D 34/416 30/276 |
| 2002/0007559 | A1 | * | 1/2002 | Morabit | A01D 34/416 30/276 |
| 2004/0154127 | A1 | * | 8/2004 | Sing | A01D 42/06 15/405 |

(Continued)

*Primary Examiner* — Sean Michalski
(74) *Attorney, Agent, or Firm* — Greenberg Traurig, LLP

(57) ABSTRACT

A rotating assembly for a grass trimmer includes a cutting element, a cutting head for mounting the cutting element and driving the cutting element to rotate about a rotating axis and a cover mounted on the cutting head. The cutting head includes a cutting head body and fan blades for generating an air flow when the cutting head being rotated, which are disposed on a top of the cutting head. The cover includes a cover body and protecting ribs for preventing the fan blades from wearing.

20 Claims, 9 Drawing Sheets

(56) References Cited

U.S. PATENT DOCUMENTS

| | | | | |
|---|---|---|---|---|
| 2006/0005347 | A1* | 1/2006 | Griffin | A01D 34/416 15/339 |
| 2006/0123635 | A1* | 6/2006 | Hurley | A01D 34/4163 30/276 |
| 2009/0090094 | A1* | 4/2009 | Million | A01D 34/416 56/13.4 |
| 2010/0126023 | A1* | 5/2010 | Griffin | A01D 42/06 30/123 |
| 2010/0307011 | A1* | 12/2010 | Hurley | A01D 34/905 30/320 |
| 2011/0302791 | A1* | 12/2011 | Proulx | A01D 34/4165 30/287 |
| 2013/0283752 | A1* | 10/2013 | Lister | A01D 34/4165 56/295 |
| 2014/0026530 | A1* | 1/2014 | Cathcart | A01D 34/416 56/12.7 |
| 2014/0150267 | A1* | 6/2014 | Sowell | A01D 34/4166 30/123 |

* cited by examiner

ROTATING ASSEMBLY FOR GRASS TRIMMER

RELATED APPLICATION INFORMATION

This application claims the benefit under 35 U.S.C. § 119(a) of Chinese Patent Application No. CN 201510595798.3, filed on Sep. 17, 2015, and Chinese Patent Application No. CN 201520721673.6, filed on Sep. 17, 2015, which are incorporated herein by reference in their entirety.

FIELD OF THE DISCLOSURE

The present disclosure relates generally to a rotating assembly for a grass trimmer.

BACKGROUND OF THE DISCLOSURE

Grass trimmers are a kind of gardening tool. The grass trimmer includes a cutting head. The cutting head is rotated at a high speed so as to drive a cutting element mounted thereon to rotate.

The cutting head generally includes a fan for cooling and blowing the grass clippings. When the fan is rotated at a high speed, the grass clippings strike the fan, so that the fan is easy to wear and damage.

The cutting element extends out of the cutting head. During operation, a friction is produced between the cutting element and a housing of the cutting head, so the cutting element is easy to wear and break.

The statements in this section merely provide background information related to the present disclosure and may not constitute prior art.

SUMMARY

In one aspect of the disclosure, a rotating assembly for a grass trimmer includes a cutting element, a cutting head for mounting the cutting element and driving the cutting element to rotate about a rotating axis and a cover mounted on the cutting head. The cutting head includes a cutting head body and fan blades for generating an air flow when the cutting head is rotated, which are disposed on a top of the cutting head. The cover includes a cover body and protecting ribs for preventing the fan blades from wearing.

Further areas of applicability will become apparent from the description provided herein. It should be understood that the description and specific examples are intended for purposes of illustration only and are not intended to limit the scope of the present disclosure.

Figure 1:
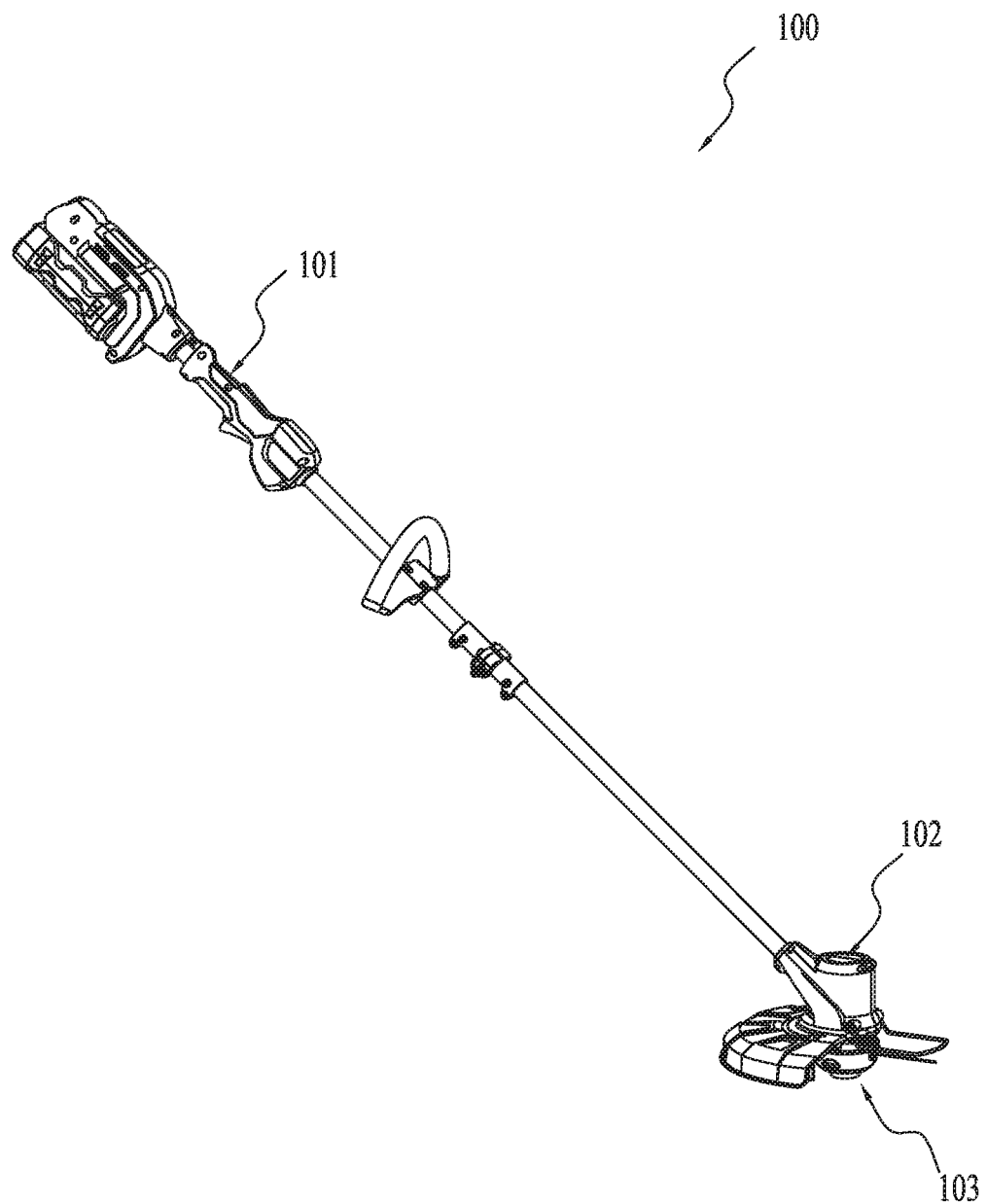
FIG. 1 is a schematic view of an exemplary grass trimmer.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The following description of the preferred embodiments is merely exemplary in nature and is in no way intended to limit the invention hereinafter claimed, its application, or uses.

As shown in FIG. 1, a grass trimmer 100 includes a handle 101, a power unit 102 and a rotating assembly 103.

The handle 101 is configured to be gripped by a user, so that the user can operate the grass trimmer 100.

The power unit 102 is configured to output power, which includes a prime mover and an output shaft. The prime mover may be an internal combustion engine which uses fuel as an energy source or a motor which uses electricity as an energy source. The prime mover can drive the rotating assembly 103 to rotate directly or indirectly. That is, the output shaft of the power unit can be a rotating shaft of the prime mover or another rotating shaft driven indirectly by the prime mover through a transmission mechanism.

Figure 2:
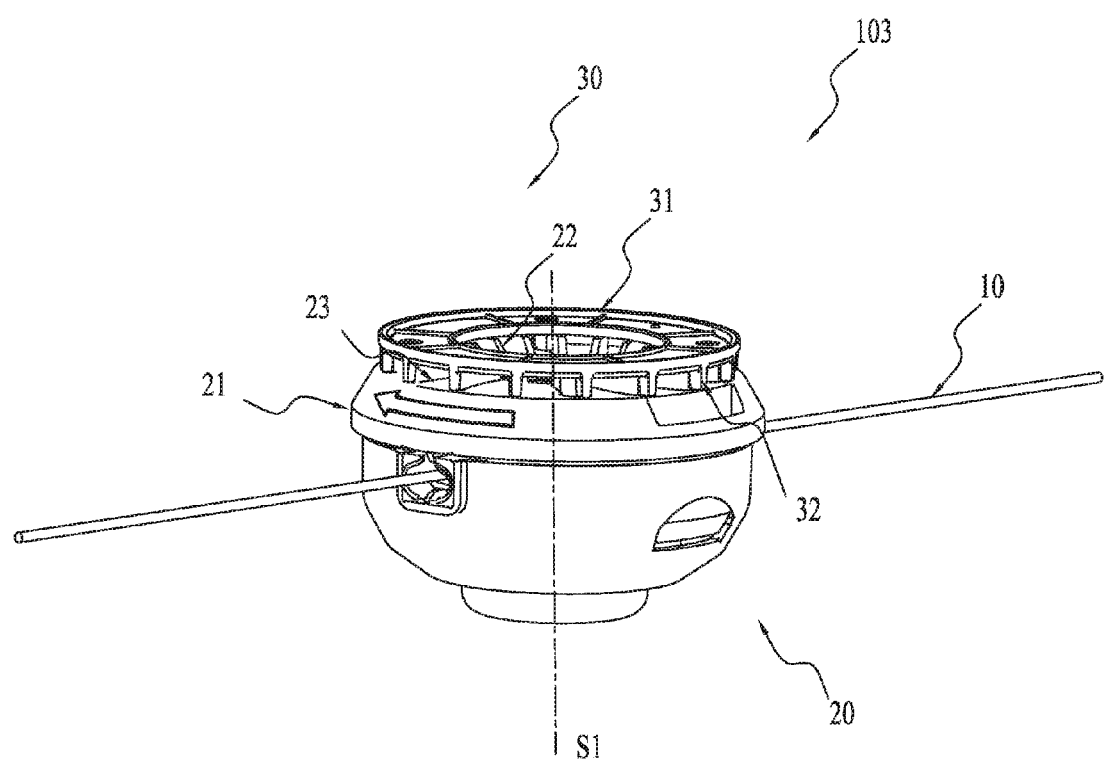
FIG. 2 is a schematic view of a rotating assembly for the grass trimmer in FIG. 1.

As shown in FIG. 2, the rotating assembly 103 includes a cutting element 10, a cutting head 20 and a cover 30.

The cutting element 10 is used to cut grass. Generally, the cutting element 10 is a cutting blade or a cutting line. In FIG. 2, the cutting element 10 is a cutting line.

The cutting head 20 is used to mount or receive the cutting element 10. The cutting head 20 is capable of rotating about a rotating axis S1 and driving the cutting element 10 to rotate together. The word 'receive' includes that the cutting element 10 is partially received in the cutting head 20.

Figure 3:
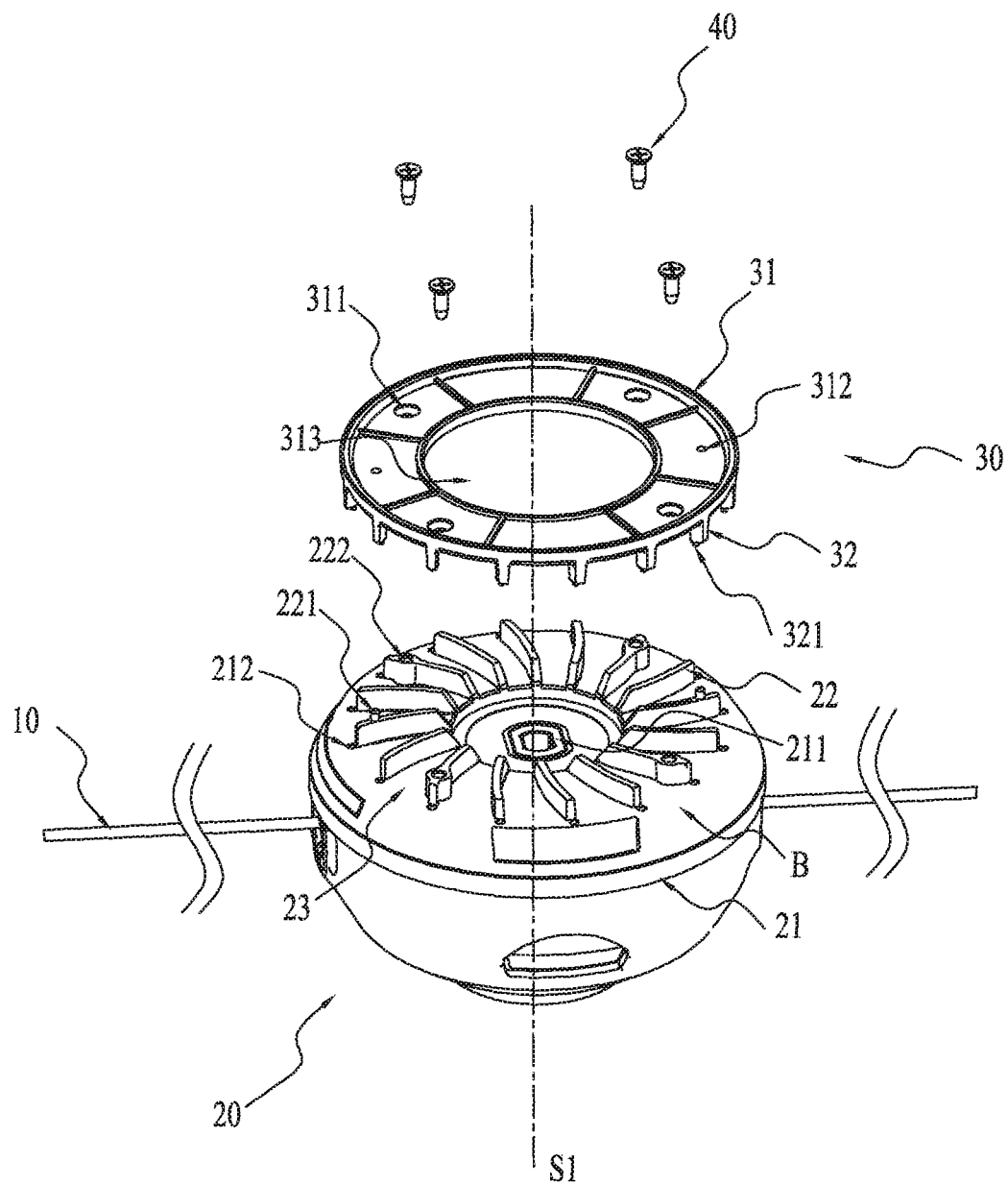
FIG. 3 is an exploded view of the rotating assembly in FIG. 2.

As shown in FIG. 3, the cutting head 20 includes a cutting head body 21 and fan blades 22.

The cutting head body 21 is provided with a mounting hole 211 for engaging with the output shaft. So the output shaft can drive the cutting head 20 to rotate.

Fan blades 22 are disposed on a top of the cutting head 20, which are used to generate an air flow when the cutting head 20 is rotated. As shown in FIG. 3, fan blades 22 are extended along an arcuate path from an inside which is close to the rotating axis S1 to an outside which is far from the rotating axis S1. An air flue 23 is formed between every two adjacent fan blades 22. A side of the air flue 23 which is close to the rotating axis S1 is defined as the inside of the air flue 23, and another side of the air flue 23 which is far from the rotating axis S1 is defined as the outside of the air flue 23. When the cutting head 20 is rotated, the air flow flows into the air flue 23 from the inside of the air flue 23 and flows out of air flue 23 from the outside of the air flue 23.

For currently known grass trimmers, the cutting head generally includes a fan. When the cutting head is rotated, the fan is rotated at a high speed and contacts with the grass. Thus, the fan is easy to wear or damage. In order to improve the working life of the fan and avoid the fan from damaging, the rotating assembly 103 includes the cover 30 which is mounted on the cutting head 20 and located on the top of the cutting head 20. The cover 30 is rotated together with the cutting head 20.

Referring to FIGS. 2-3, the cover 30 includes a cover body 31 and protecting ribs 32.

Figure 4:
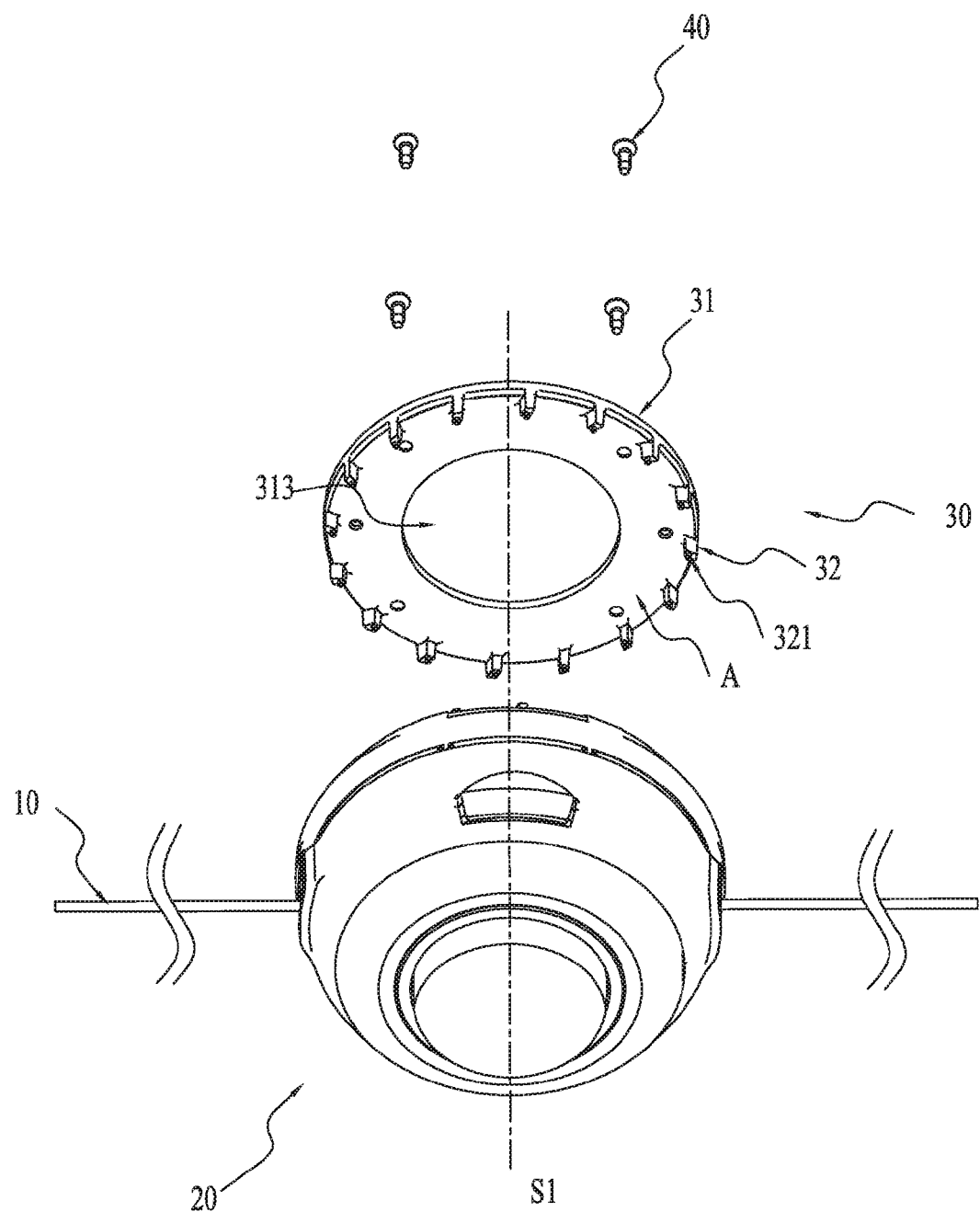
FIG. 4 is another exploded view of the rotating assembly in FIG. 2.
Figure 5:
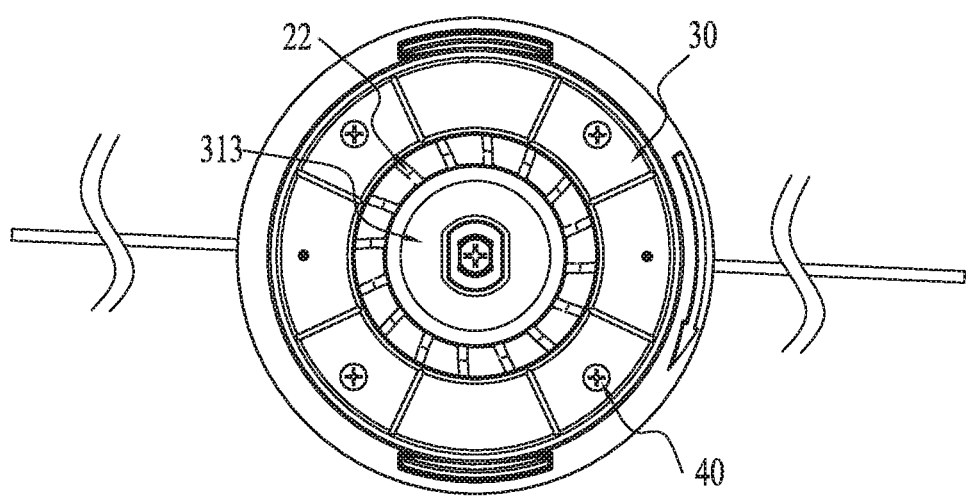
FIG. 5 is a schematic view of a top of the rotating assembly in FIG. 2.

The cover body 31 is configured to fix or mount the cover 30. As shown in FIG. 3, the cover body 31 is provided with screw holes 311. The cutting head 20 is provided with engaging holes 222. Screws 40 pass through the screw holes 311 and engage with the engaging holes 222, so that the cover 30 is fixed to the cutting head 20. Referring to FIGS. 3-5, the screw holes 311 are distributed uniformly relative to the rotating axis S1. So it provides good dynamic balance. In order to facilitate the alignment of the screw holes 311 and the engaging holes 222 when the cover 30 is rotated, the cover 30 is provided with limiting holes 312, and the fan blades 22 are provided with limiting pins 221. The limiting pins 221 are capable of engaging with the limiting holes 312.

The protecting ribs 32 are used to prevent the outer edges of the fan blades 22 from wearing. Specifically, the protecting ribs 32 are disposed on the arcuate extending path of the fan blades 22 and located on the outside of the fan blades 22. The protecting ribs 32 are formed or mounted on the cover body 31. Referring to FIGS. 3-4, the protecting ribs 32 are formed on the cover body 31.

Specifically, the fan blades 22 are at least made of a first material, and the protecting ribs 32 are at least made of a second material. The hardness of the second material is greater than that of the first material. So the protecting ribs 32 have better wearability than the fan blades 22, which avoids the protecting ribs 32 from wearing effectively. Thus, the working life of the protecting ribs 32 is improved. The cover 30 is not only capable of protecting the fan blades 22, but also capable of preventing the grass from winding on the output shaft when the cutting head 20 is rotated. So the anti-winding function is realized.

As shown in FIG. 3, the protecting ribs 32 are formed with locating pins 321 which are extended in a direction that is toward the cutting head body 21. The cutting head body 21 is formed with locating recesses 212 which are capable of engaging with the locating pins 321. The direction that is toward the cutting head body 21 means a direction from the cover body 31 to the cutting head body 21.

The fan blades 22 protrude toward the cover body 31. The top of the fan blades 22 contact with the bottom of the cover 30 or extended into the cover 30. Thus, the strength and the working life of the fan blades 22 are improved. Further, because the top of the air flues 23 are closed by the cover 30, the air flow can only enter the air flues 23 from the inside and exhaust from the air flues 23 from the outside. So the quantity of flow and flowing speed of the air flow are improved. As shown in FIG. 2, specifically, the top of the fan blades 22 contacts with the bottom of the cover 30. The protecting ribs 32 protrude toward the cutting head body 21 and align with the fan blades 22.

Referring to FIGS. 3-4, the cover body 31 includes a first surface A on its side facing the cutting head body 21. The first surface A contacts with the fan blades 22. The cutting head body 21 includes a second surface B on its side facing the cover body 31. The second surface B is substantially parallel to the first surface A. In order to protect the fan blades 22 in a direction of the rotating axis S1, the protecting ribs 32 have a size which is greater than or equal to the size of the fan blades 22 in the direction of the rotating axis S1. Specifically, the size of the protecting ribs 32 is equal to the maximum size of the fan blades 22 in the direction of the rotating axis S1.

The cover 30 is provided with a central through hole 313. The rotating axis S1 of the cutting head 20 passes through the central through hole 313. The output shaft passes through the central through hole 313 and the mounting hole 211. The central through hole 313 allows the fan blades 22 to be exposed to the cover 30. That means, as shown in FIG. 5, in the direction of the rotating axis S1, when observing the rotating assembly 103 from one side of the cover 30, the fan blades 22 can be observed from the central through hole 313 of the cover 30. Because the fan blades 22 are exposed to the cover 30 through the central through hole 313, the air flow that enters into the central through hole 313 can be divided and guided so that the flowing speed is accelerated.

Figure 6:
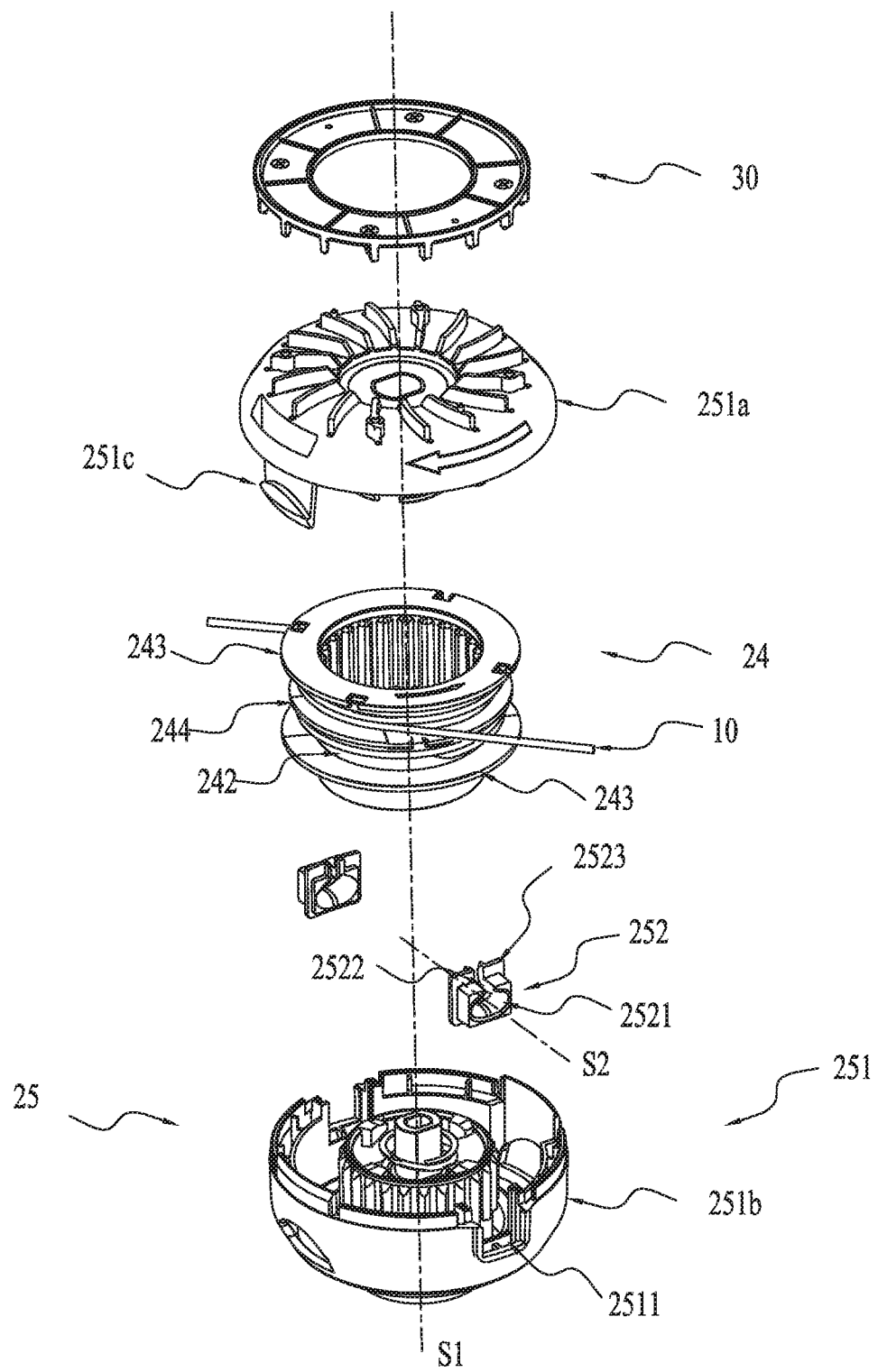
FIG. 6 is a schematic view showing the inner structure of the rotating assembly in FIG. 1.

As shown in FIG. 6, the cutting head 20 includes a spool 24 and a housing assembly 25.

The spool 24 is used for the cutting element 10 to be wound upon. The spool 24 includes a columnar portion 242 extending in the direction of the rotating axis S1. The columnar portion 242 includes two end flanges 243 which are extended outwardly and respectively located on the two ends of the columnar portion 242. The cutting element 10 is wound upon the columnar portion 242 between the two end flanges 243. Further, the columnar portion 242 includes a partition flange 244 which is extended outwardly and located in the middle of the columnar portion 242. A winding portion 241 is formed between the partition flange 244 and each end flange 243. The cutting element 10 is wound upon the winding portion 241. Due to the partition flange 244, the spool 24 includes two winding portions 241. In other embodiment, the spool may not include the partition flange. That is, there is only one winding portion disposed between the two flanges.

The housing assembly 25 is configured to contain the spool 24. The spool 24 is capable of rotating relative to the housing assembly 25. When the spool 24 is rotated in one direction relative to the housing assembly 25, the length of the cutting element 10 released by the rotating assembly 103 is increased, and the line releasing function is realized. When the spool 24 is rotated in the reverse direction relative to the housing assembly 25, the cutting element 10 is wound upon the spool 24, and the line winding function is realized.

The housing assembly 25 is provided with eyelets 2521. The cutting element 10 is extended out of the housing assembly 25 through the eyelets 2521. Specifically, the housing assembly 25 is provided with gaps 2522 in the axial direction of the rotating axis S1. The gaps 2522 are communicated with the eyelets 2521. The cutting element 10 can be snapped into the eyelets 2521 from the gaps 2522 along the axial direction of the rotating axis S1.

Specifically, the housing assembly 25 includes a housing 251 and retainers 252. The housing 251 is configured to contain the spool 24. As shown in FIG. 6, the housing 251 includes an upper housing 251a and a lower housing 251b which are connected with each other through hooks 251c. The eyelets 2521 can be formed by the housing 251. That is, the housing assembly 25 may not include the retainers 252. The eyelets 2521 also can be formed by the retainers 252. As shown in FIG. 6, the eyelet 2521 is approximately extended along a radial direction of the rotating axis S1. The extending direction of the eyelet 2521 is referred as a direction S2 in FIG. 6.

As shown in FIG. 6, the retainers 252 are fixed on the housing 251 and formed with the eyelets 2521. The gaps 2522 are formed on the retainers 252. The retainers 252 are further formed with fixing ribs 2523. The housing 251 is formed with fixing recesses 2511 for engaging with the fixing ribs 2523.

Figures 7A, 7B, 7C:
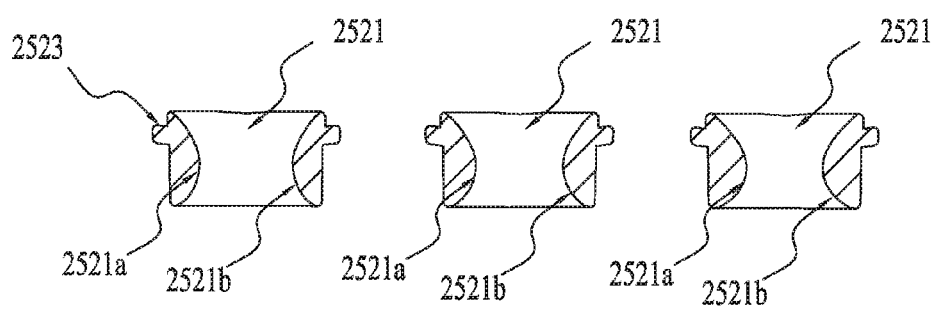
FIGS. 7A-7F are section views of eyelets of the rotating assembly in FIG. 1.

When the rotating assembly 103 is working, friction is produced between the cutting element 10 and the inner walls of the eyelets 2521, so the cutting element 10 is easy to break. In order to reduce the friction, a first section of a first plane that is perpendicular to the rotating axis S1 is defined as a longitudinal section of the eyelets 2521. FIGS. 7a-7c show the longitudinal sections of the eyelet 2521 which are cut in different positions. A first section shape of the eyelet 2521 cut by the longitudinal section includes a first longitudinal cutting arcuate edge 2521a and a second longitudinal cutting arcuate edge 2521b which are opposite to each other. The tops of the first longitudinal cutting arcuate edge 2521a and the second longitudinal cutting arcuate edge 2521b are close to each other relative to other portion of the two longitudinal cutting arcuate edges 2521a, 2521b, or the first longitudinal cutting arcuate edge 2521a and the second longitudinal cutting arcuate edge 2521b protrude towards each other. It can be thus said that the first longitudinal cutting arcuate edge 2521a and the second longitudinal cutting arcuate edge 2521b are firstly close to each other and then depart from each other along one direction.

Figures 7D, 7E, 7F:
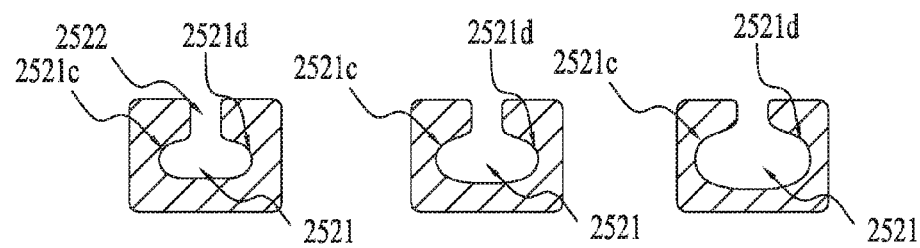

A second section of a second plane which is perpendicular to the extending direction of the eyelet 2521 is defined as a lateral section. FIGS. 7d-7f show the lateral sections of the eyelet 2521 cut in different positions. A second section shape of the eyelet 2521 cut by the lateral section includes a first lateral cutting arcuate edge 2521c and a second lateral cutting arcuate edge 2521d which are departed from each other. The tops of the first lateral cutting arcuate edge 2521c and the second lateral cutting arcuate edge 2521d are far from each other relative to other portions of the two lateral cutting arcuate edges 2521c, 2521d, or the first lateral cutting arcuate edge 2521c and the second lateral cutting arcuate edge 2521d protrude toward two opposite directions. It can thus be said that the first lateral cutting arcuate edge 2521c and the second lateral cutting arcuate edge 2521d firstly depart from each other and then are close to each other along one direction.

Figure 8:
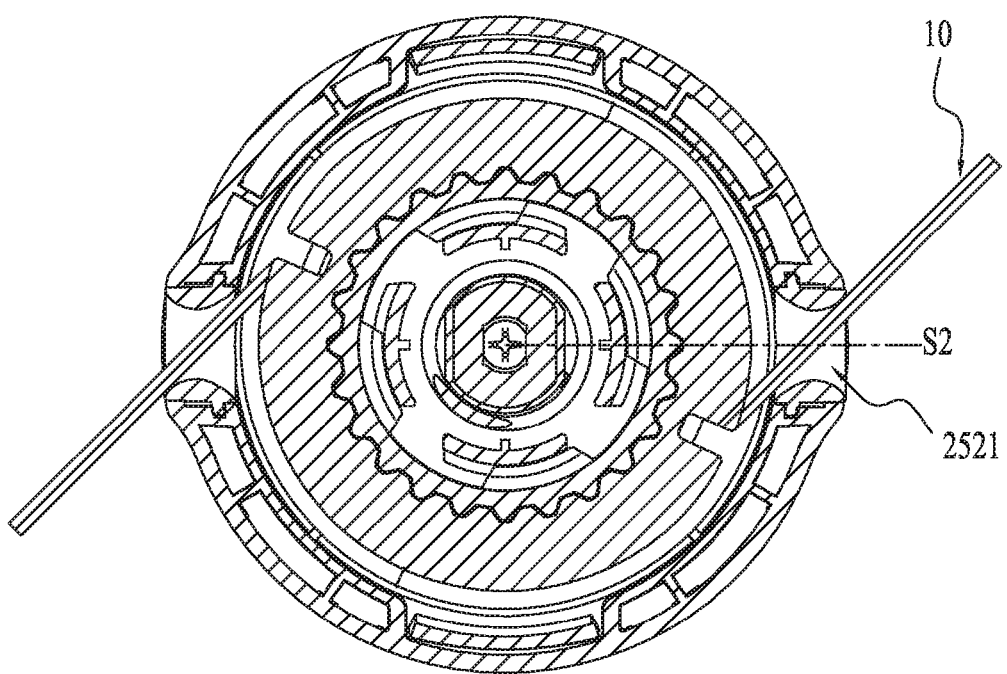
FIG. 8 is a section view of the rotating assembly in FIG. 1.

As shown in FIGS. 7d-7f, the lateral section of the eyelet 2521 includes a portion of a waist-shaped hole. As shown in FIG. 8, the winding portions 241 are so arranged that the cutting element 10 extends in a direction which intersects obliquely with the extending direction S2 of the eyelet 2521 when the cutting element 10 is extended out of the eyelet 2521.

As shown in FIG. 6, the cutting element 10 can extend out of the eyelets 2521 along the direction which is oblique relative to the extending direction S2. That avoids the cutting element 10 from bending when the cutting element 10 passes through the eyelets 2521 and reduces the friction between the cutting element 10 and the eyelets 2521. So the working life of the cutting element 10 is improved. Further, due to the special shape of the eyelets 2521, the cutting element 10 contacts with the eyelets 2521 smoothly. So it further avoids the cutting element 10 from damage.

A position at the minimum distance between the first longitudinal cutting arcuate edge 2521a and the second longitudinal cutting arcuate edge 2521b is defined as a width position of the eyelet 2521. The maximum distance between the first lateral cutting arcuate edge 2521c and the second lateral cutting arcuate edge 2521d at the width position is defined as the width of the eyelet 2521.

Figure 9A:
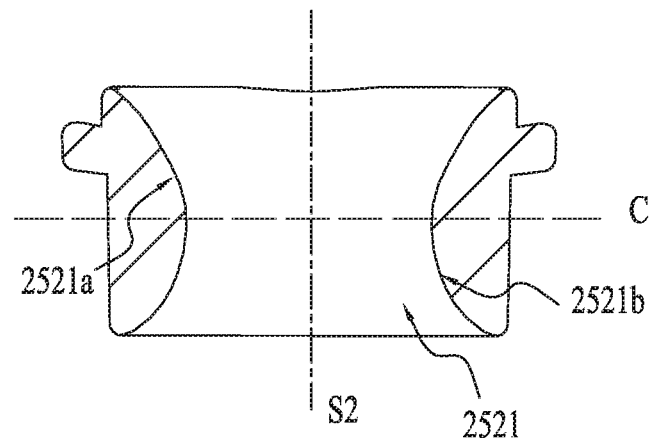
FIGS. 9A-9B are section views of eyelets of the rotating assembly in FIG. 1.
Figure 9B:
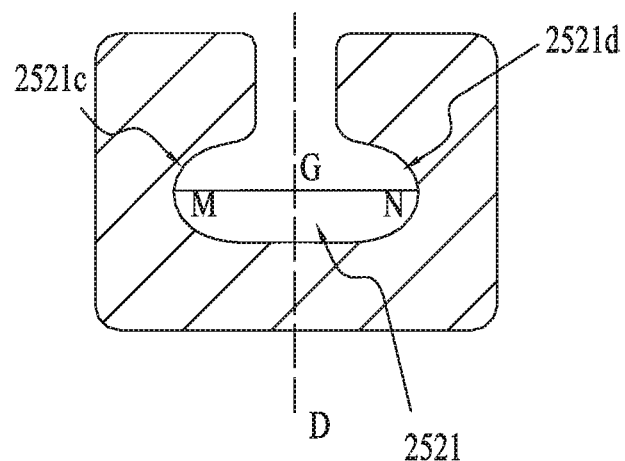

As shown in FIGS. 7a-7f, the lateral sections and longitudinal sections of the eyelet 2521 cut at different positions have different shapes and sizes. Corresponding with the first longitudinal cutting arcuate edges 2521a and the second longitudinal cutting arcuate edges 2521b cut at different positions, the lateral sections of the eyelet 2521 have different sizes. As shown in FIG. 9a, the distance between first longitudinal cutting arcuate edge 2521a and the second longitudinal cutting arcuate edge 2521b is the minimum in a lateral section C. As shown in FIG. 9b, in the lateral section C, point M and N are the points of the first lateral cutting arcuate edge 2521c and the second lateral cutting arcuate edge 2521d which are farthest from each other. That is, the length between points M and N is the maximum distance between the first lateral cutting arcuate edge 2521c and the second lateral cutting arcuate edge 2521d, which is the width of the eyelet 2521.

As shown in FIG. 9a, the maximum size of the eyelet 2521 in its extending direction S2 is defined as a length of the eyelet 2521. A ratio between the width and length of the eyelet 2521 is greater than or equal to 0.5 and less than or equal to 2.

As shown in FIG. 9b, a midpoint of a line connecting the two points M, N is a center G of the eyelet 2521. A straight line which passes through the center G, perpendicular to the rotating axis S1 and intersects with the rotating axis S1 is defined as an axis of the eyelet 2521. The axis and the extending direction of the eyelet 2521 are consistent.

The first lateral cutting arcuate edge 2521c and the second lateral cutting arcuate edge 2521d in the lateral section at the width position are symmetrical. The first lateral cutting arcuate edge 2521c includes an arc. The second lateral cutting arcuate edge 2521d also includes an arc.

As shown in FIG. 9b, the eyelet 2521 is symmetrical about a plane which is defined as a symmetry plane D of the eyelet 2521. The rotating axis S1 is in the symmetry plane D. The symmetry plane D is formed by the axis of the eyelet 2521 and the rotating axis S1.

The number of the eyelets 2521 is greater than or equal to 2. The multiple eyelets 2521 are distributed uniformly in a circumferential direction of the rotating axis S1. For example, the number of the eyelets 2521 is 3, and an angle between two adjacent eyelets 2521 is 120 degrees.

The above illustrates and describes basic principles, main features and advantages of the present invention. Those skilled in the art should appreciate that the above embodiments do not limit the claimed invention in any form. Technical solutions obtained by equivalent substitution or equivalent variations all fall within the scope of the claimed invention.

What is claimed is:

1. A rotating assembly for a grass trimmer, comprising:
   a cutting element; and
   a cutting head for mounting the cutting element and driving the cutting element to rotate about a rotating axis, the cutting head comprising:
   a cutting head body;
   fan blades for generating an air flow when the cutting head is rotated disposed on a top of the cutting head; and
   a cover mounted on the cutting head, the cover comprising:
   a cover body; and
   protecting ribs for preventing the fan blades from wearing.

2. The rotating assembly of claim 1, wherein the fan blades protrude toward the cover body, each of the fan blades having a top which contacts with a bottom of the cover body or extend into the cover body.

3. The rotating assembly of claim 2, wherein the protecting ribs protrude in a direction that is toward the cutting head body and the protecting ribs correspond with the fan blades.

4. The rotating assembly of claim 3, wherein the protecting ribs have a size in a direction of the rotating axis which is greater than or equal to a size of the fan blades in the direction of the rotating axis.

5. The rotating assembly of claim 1, wherein the cover body comprises a first surface on its side facing the cutting head body and the first surface contacts with the fan blades.

6. The rotating assembly of claim 5, wherein the cutting head body comprises a second surface on its side facing the cover body and the second surface is substantially parallel to the first surface.

7. The rotating assembly of claim 6, wherein the protecting ribs have a size in a direction of the rotating axis which is equal to a size of the fan blades in the direction of the rotating axis.

8. The rotating assembly of claim 1, wherein the cover is provided with a central through hole which allows the fan blades to be exposed to the cover.

9. The rotating assembly of claim 1, wherein the protecting ribs are formed with locating pins extending toward the cutting head body and the cutting head body is formed with locating recesses for engaging with the locating pins.

10. The rotating assembly of claim 1, wherein the fan blades are made of at least a first material and the protecting ribs are made of at least a second material, the hardness of the second material being greater than the first material.

11. The rotating assembly of claim 1, wherein the cutting head comprises a spool for winding the cutting element and a housing assembly for containing the spool, the housing assembly being provided with eyelets extending in a radial direction of the rotating axis, and wherein a first section of a first plane which is perpendicular to the rotating axis is a longitudinal section of the eyelets, a first section shape of the eyelets cut by the longitudinal section comprises a first longitudinal cutting arcuate edge and a second longitudinal cutting arcuate edge which are opposite to each other, a second section of a second plane which is perpendicular to an extending direction of the eyelets is a lateral section of the eyelets, a second section shape of the eyelets cut by the lateral section comprises a first lateral cutting arcuate edge and a second lateral cutting arcuate edge which are departed from each other.

12. The rotating assembly of claim 11, wherein a position at a minimum distance between the first longitudinal cutting arcuate edge and the second longitudinal cutting arcuate edge is defined as a width position and a maximum distance between the first lateral cutting arcuate edge and the second lateral cutting arcuate edge at the width position is defined as a width of the eyelets and wherein, in the extending direction of the eyelets, the eyelets have a maximum size which is defined as a length of the eyelet and a ratio between the width and the length of the eyelets is greater than or equal to 0.5 and less than or equal to 2.

13. The rotating assembly of claim 12, wherein the first lateral cutting arcuate edge and the second lateral cutting arcuate edge in the lateral section at the width position are symmetrical.

14. The rotating assembly of claim 11, wherein each eyelet is symmetrical about a plane which is defined as a symmetry plane of the eyelet and the rotating axis is in the symmetry plane.

15. The rotating assembly of claim 1, wherein the cutting head comprises a spool for the cutting element to be wound upon and a housing assembly for containing the spool, the housing assembly is provided with eyelets extending in a radial direction of the rotating axis, and the cutting element is extended out of the eyelets along a line direction.

16. The rotating assembly of claim 15, wherein the cutting element at least partially intersects obliquely with an extending direction of the eyelets and a lateral section of the eyelets comprises a portion of a waist-shaped hole.

17. The rotating assembly of claim 15, wherein the housing assembly is formed with gaps in a direction of the rotating axis and the gaps are communicated with the eyelets.

18. The rotating assembly of claim 15, wherein the spool is provided with winding portions for the cutting element to be wound upon, the spool comprises a columnar portion extending in a direction of the rotating axis, the columnar portion comprises two end flanges on its two ends which are extended outwardly and a partition flange in its middle which is extended outwardly, the winding portions are located between the partition flange and the end flanges.

19. The rotating assembly of claim 15, wherein the housing assembly comprises a housing for containing the spool and a retainer formed with the eyelets which is fixed on the housing.

20. The rotating assembly of claim 19, wherein the retainer is formed with fixing ribs and the housing is formed with fixing recesses for engaging with the fixing ribs.

* * * * *